Patented July 27, 1926.

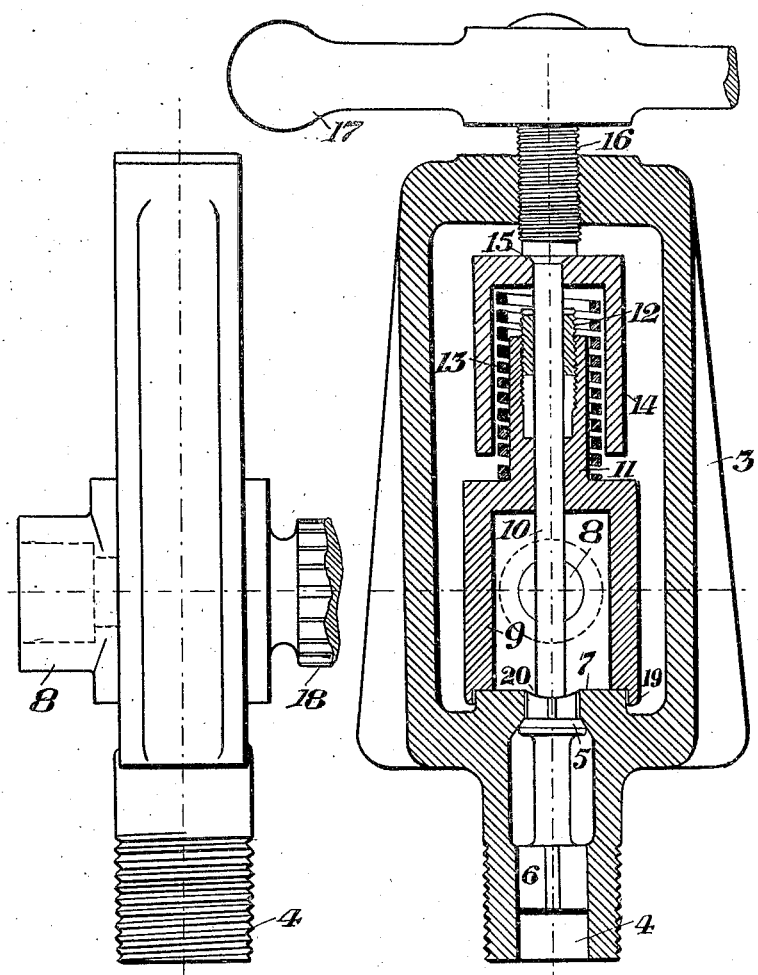

1,593,772

UNITED STATES PATENT OFFICE.

WALTER W. LITSTER, OF VICTORIA, BRITISH COLUMBIA, CANADA.

SAFETY DEVICE FOR OIL-FUEL BURNERS.

Application filed July 29, 1924. Serial No. 728,874.

This invention relates to safety devices in connection with the supply of liquid fuel under pressure to boiler and other furnaces, where failure to observe the requisite precautions whether through inadvertence or otherwise is frequently fatal to life as well as disastrous to property.

The prime object of my invention is to provide a simple and practical device which shall entirely obviate the risks above indicated by eliminating the personal factor concerned therein.

The very serious element of danger in connection with hot fuel oil under high pressure in confined situations is obvious. And the operation of exchanging a foul or faulty burner is a frequent item of routine in connection with fuel oil equipment. Failure to close the supply stop valve, say through a momentary lapse of alertness prior to removing the burner immediately produces a serious situation which is by no means unknown. This condition is entirely eliminated by the adoption of my device which is best described by reference to the drawings herewith in which Fig. 1 is a general sectional view and Fig. 2 a side elevation of same. 3 is a stirrup shaped member carrying the oil fuel supply inlet at 4. On this inlet are arranged a check valve at 5 having a guide at 6, and a flat valve having its seat at 7. The latter is hollow as shown and carries a branch pipe connection at 8 which is threaded to receive the burner. The hollow flat seated cap valve 9 is pierced by a stop pin 10 which passes through an extension in the end of the hollow cap at 11, and this extension is provided with a screw gland at 12. Around the outside of the extension and gland is a helical spring 13 which is compressed between the outside of the cap valve and the innerside of the spring case 14. The latter also acts as a distance piece and has secured to it at 15 the stop pin 10, so that both the spring case and the pin move together when the set screw 16 is regulated. The latter is attached to a substantial hand grip at 17.

The hollow cap valve permits slight angular movement arounds its seat and so gives a certain adjustment to the burner direction, to facilitate this a handgrip is attached to the exterior of the cap valve at 18 opposite the outlet orifice at 8. The cap valve is extended at 19 to form a lip around the flat seat 7 to prevent any hot oil which might possibly be locked in the cavity due to a blocked burner from being blown out laterally.

The operation of the device is very simple, With the various parts in the positions shown in the drawing the adjusting screw 16 has been released just sufficiently to permit the check valve 5 to close. The spring is still holding the cap valve 9 firmly on its seat 7; as the set screw 16 is further released the spring 13 will raise the stop pin 10 out of the slight concavity on the top of the check valve at 20 until the lip 19 can be slipped over the flat valve seat 7 so releasing burner and all the parts in connection with it for examination. Meanwhile the check valve 5 is holding the oil under pressure. When a burner is to be replaced the operation is repeated in reverse order, either being the work of but a few seconds.

It is to be noted the strength of the compression spring is so designed that it exerts a pressure on the cap valve seat 7 which is in excess of the opposing pressure due to the oil flow at the moment when the pin 10 releases the valve 5. There is therefore no possibility of the temporary escape of oil under pressure around the valve face 7 before the adjusting screw 16 has positively locked the cap valve 9 on its seat.

What I claim as my invention and desire to secure by Letters Patent, is:

In a fuel oil burner the combination comprising, a valve seating member carrying two valve seats in connection with a pipe inlet, one of said valve seats being flat and the other conical, said member supporting a nut opposite said valve seats and beyond an intervening space, said valve seats and said nut being on the same axial centre line, a check valve engaging one of said valve seats and operating to check the oil supply through both said seats, a hollow cap valve with pipe branch attached and adapted to close said flat valve seat an adjusting screw engaging aforesaid nut, an axial stop pin extending between said check valve and said adjusting screw and passing through a gland on an extension of said cap valve, a helical spring surrounding said extension and adapted to close said cap valve, a hollow cylindrical distance piece surrounding said helical spring and secured to said stop pin, the inside end of said distance piece acting as an abutment for said spring, the whole being arranged so that when the check valve is fully opened by the depression of the adjusting screw the said distance piece engages the top of said cap valve forming a positive and continuous connection between the cap valve and the said adjusting screw.

WALTER W. LITSTER.